Sept. 28, 1965    H. KASTAN    3,208,696
FUEL TANK
Filed Aug. 19, 1963    4 Sheets-Sheet 1

INVENTOR.
HOWARD KASTAN
BY
*George Sullivan*
Agent

Sept. 28, 1965     H. KASTAN     3,208,696
FUEL TANK
Filed Aug. 19, 1963     4 Sheets-Sheet 2
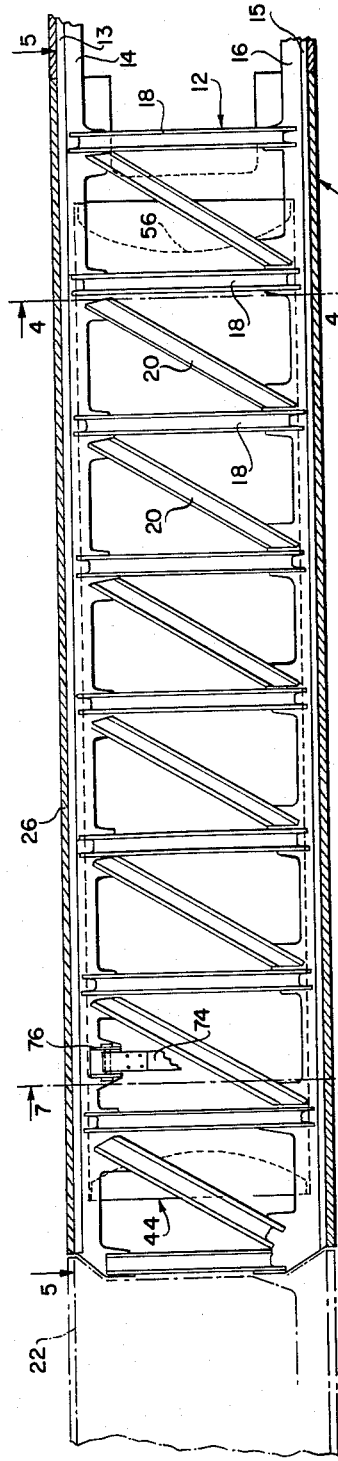
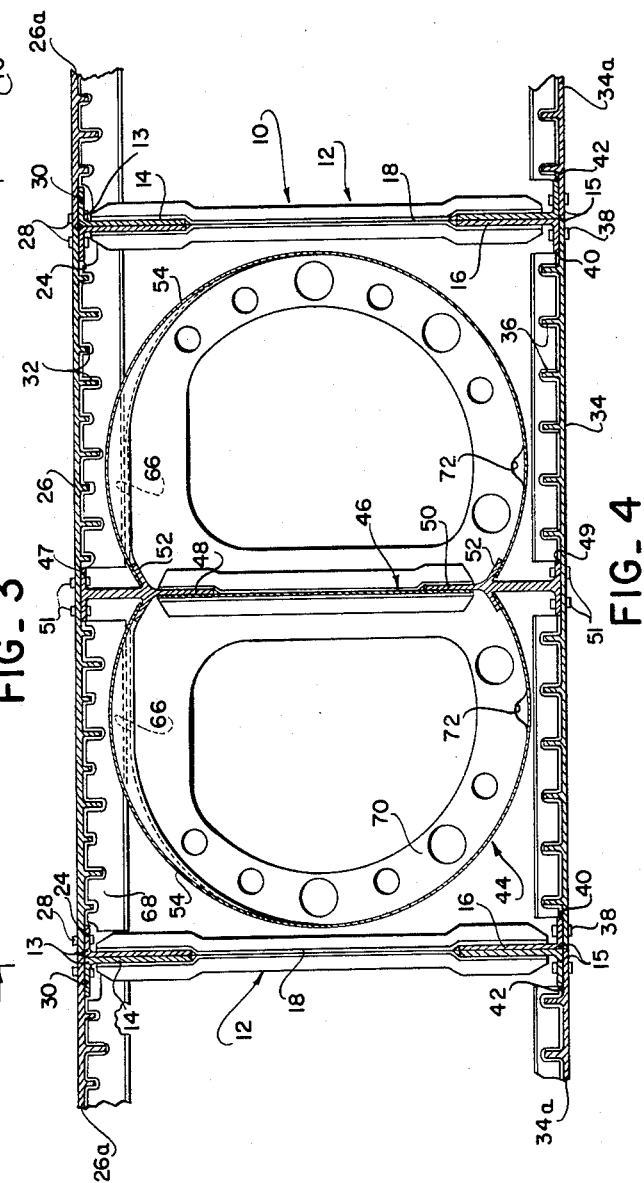
INVENTOR.
HOWARD KASTAN
BY
*George C. Sullivan*
Agent Sept. 28, 1965  H. KASTAN  3,208,696
FUEL TANK
Filed Aug. 19, 1963  4 Sheets-Sheet 3
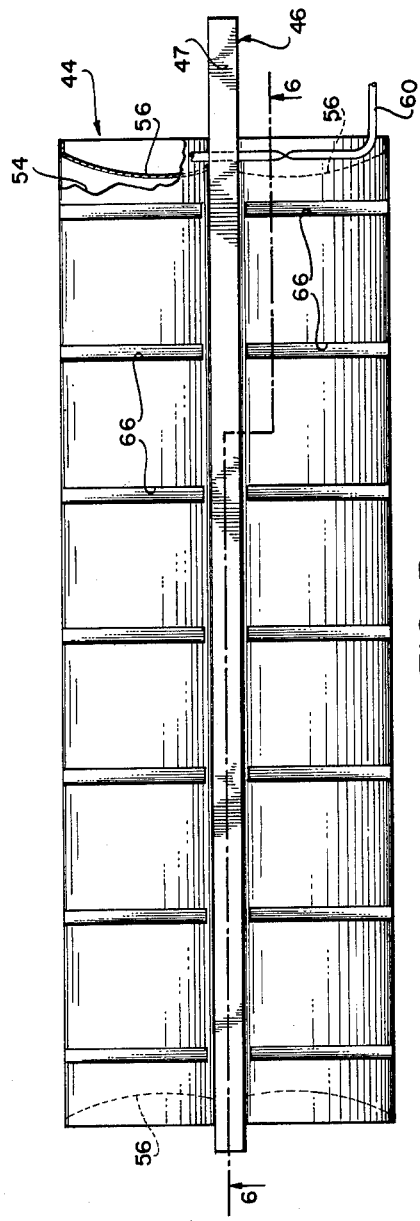
FIG_5
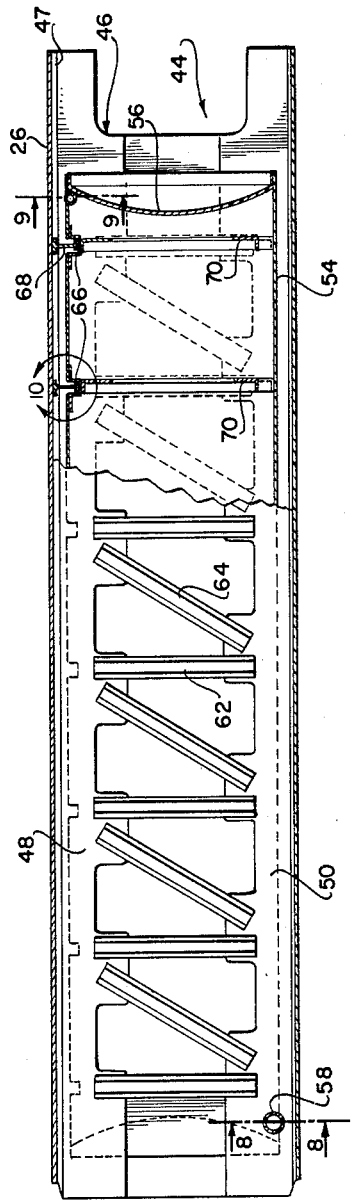
FIG_6
INVENTOR.
HOWARD KASTAN
BY
Agent Sept. 28, 1965 H. KASTAN 3,208,696
FUEL TANK
Filed Aug. 19, 1963 4 Sheets-Sheet 4
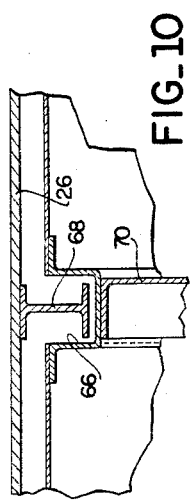
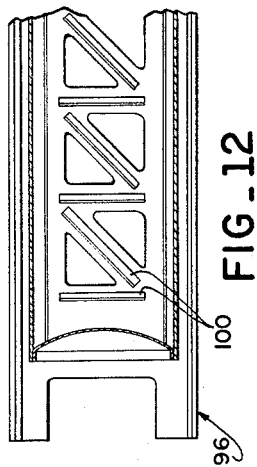
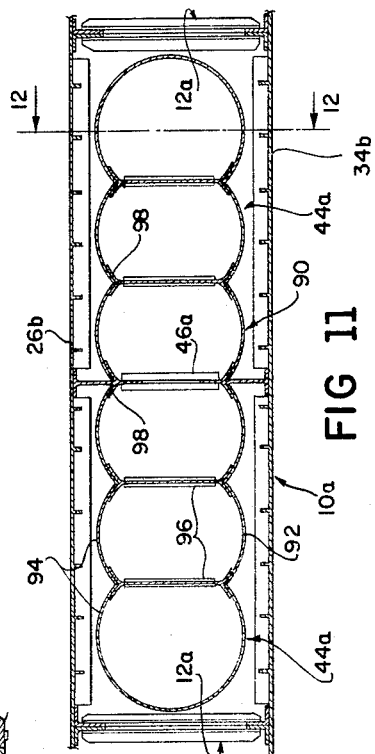
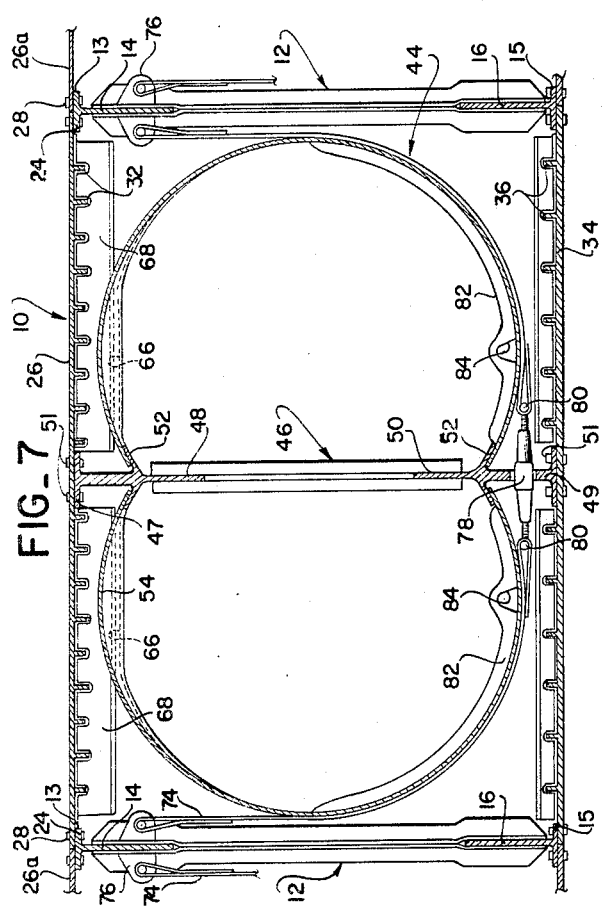
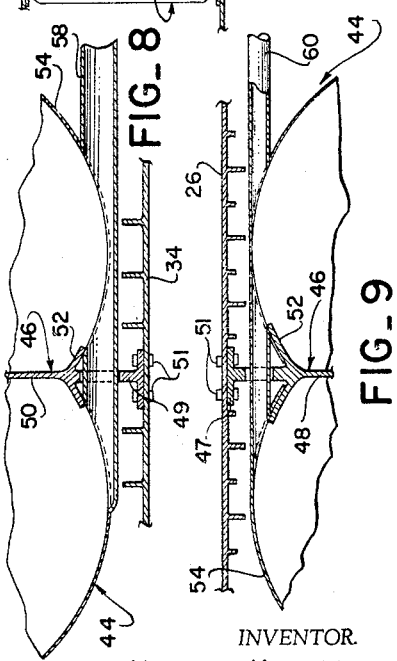
INVENTOR.
HOWARD KASTAN
BY George C. Sullivan
Agent

United States Patent Office 3,208,696
Patented Sept. 28, 1965

3,208,696
FUEL TANK
Howard Kastan, Northridge, Calif., assignor to Lockheed
Aircraft Corporation, Burbank, Calif.
Filed Aug. 19, 1963, Ser. No. 303,114
5 Claims. (Cl. 244—135)

This invention relates to a fuel tank, and more particularly to a fuel tank for the wing of a winged vehicle wherein the fuel tank strengthens the wing and is thermally isolated.

The wings of a supersonic aircraft and the like may be subjected to severe aerodynamic heating for prolonged periods of time. The storage of fuel in such wings presents a problem which was solved in the prior art by insulating the fuel tanks. Also, prior art aircraft wing tanks are non-structural in that they contribute weight but no strength to aircraft wings. Furthermore, it is very difficult to inspect conventional fuel tanks and the structure surrounding the tanks.

In addition, during supersonic flight, fuel tank sealing materials are subjected to temperatures of 500° F. or greater and prior art sealing materials generally will not withstand such temperatures.

In view of the foregoing factors and conditions characteristic of fuel tanks for the storage of fuel in the wings of supersonic aircraft and the like, it is a primary object of the present invention to provide a new and improved fuel tank not subject to the disadvantages enumerated above which is structurally self-sufficient and which has elements that contribute directly to the strength of an aircraft wing.

Another object of the present invention is to provide a wing tank for a supersonic aircraft which provides thermal protection of fuel without the use of insulation or coolants.

Yet another object of the present invention is to provide a fuel tank for the wing of an aircraft which is easily removable for inspection and maintenance.

A further object of the present invention is to provide a wing tank for supersonic aircraft which is not dependent upon exceptional material development for a long service life at high temperatures.

A still further object of the present invention is to provide a fuel tank for the wing of a supersonic aircraft which is arranged within the wings in such a manner that adequate access is provided for inspection of the internal structure of the wing.

According to the present invention, thermally isolated fuel tanks are provided for aircraft wings using box beam construction. The fuel tanks are of welded construction so that sealing materials are eliminated in this regard. The tank design may incorporate minimum size "pipe plug" type doors and access panels screwed into welded fittings so that sealing material around access panels is also eliminated.

Each tank is attached to the upper and lower surfaces of a box beam bay or cell by a self-contained tank beam or spar which passes longitudinally through the tank and forms an integral part thereof. This tank beam is used structurally in the construction of a box beam bay. Each tank may be supported additionally by attachment means connected to the main box beams forming a bay or cell. The attachment of the tanks to the aircraft wing is such that the conductive heat flow into the tanks may be reduced to less than 10% of the total heat flux.

The tanks are independent units which may be quickly installed in, or removed from, the box beam bays. The tanks are designed as efficient pressure vessels so that they may be constructed of a lighter gauge material than would be the case if the tank were shaped to follow the contour of the aircraft wing. The elimination of the need for insulation materials provides additional weight savings.

In one embodiment of the present invention, the fuel tank comprises two intersecting, cylindrical shells with the plane of intersection coinciding with a truss-type shear beam in the aircraft wing box. The shear beam is connected with the upper and lower cap members of the wing box so that the center of the tank is integrally supported by the wing structure. Buckling of the tank upper surface due to compression stresses induced by wing deflection is prevented by incorporating embossed reliefs in the upper skin of the tank to allow the tank to deflect by elastic deformation. Longitudinal forces from tank pressure are transferred by the tank heads to the wing box structure. Ellipsoidal tank heads are provided with an inward bulge so that they are maintained in hoop compression by the internal fuel pressure.

In a second embodiment of the invention, additional cylindrical shells intersect the main shells. These intersecting shells are connected to the main shells and to each other with interconnecting tension webs. The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 3 is an elevational view of the wing and fuel tank assembly of FIGURE 2;

FIGURE 4 is a transverse, cross-sectional view taken along line 4—4 of FIGURE 3 to an enlarged scale;

FIGURE 5 is a plan view of the fuel tank constituting a first embodiment of the present invention taken along line 5—5 of FIGURE 3 with parts eliminated for clarity;

FIGURE 6 is a cross-sectional view of the tank of FIGURE 5 taken along line 6—6 of FIGURE 5 and including the panel members from FIGURE 3;

FIGURE 7 is a cross-sectional view, on an enlarged scale, taken along line 7—7 of FIGURE 3;

FIGURE 8 is a partial, cross-sectional view, on an enlarged scale, taken along line 8—8 of FIGURE 6;

FIGURE 9 is a partial, cross-sectional view, on an enlarged scale, taken along line 9—9 of FIGURE 6;

FIGURE 10 is an enlarged view of the area enclosed in circle 10 of FIGURE 6;

FIGURE 11 is a cross-sectional view of a fuel tank constituting a second embodiment of the present invention; and FIGURE 12 is a partial, cross-sectional view taken along line 12—12 of FIGURE 11.

Figure 2:
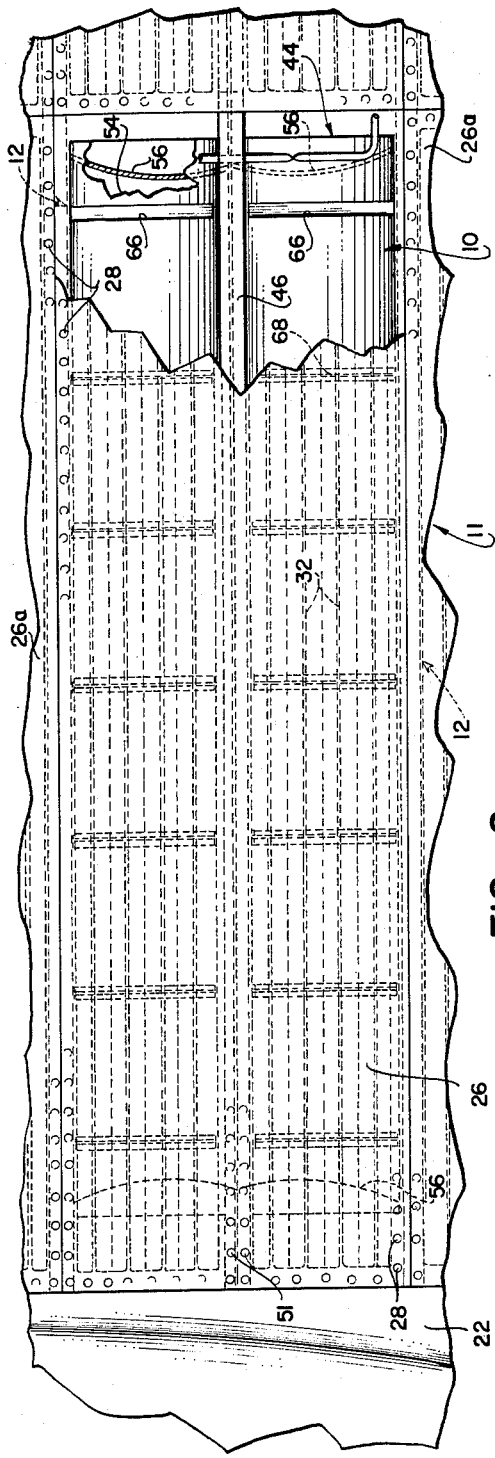
FIGURE 2 is a plan view of the portion of the aircraft of FIGURE 1 enclosed within circle 2.
Figure 1:
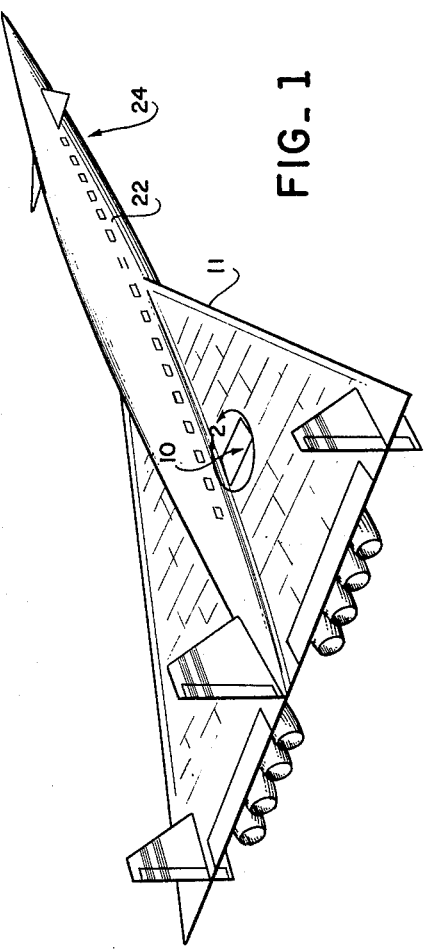
FIGURE 1 is a perspective view of an aircraft incorporating a fuel tank constituting a first embodiment of the present invention.

Referring again to the drawings, and particularly to FIGURES 1–10, the device constituting a first embodiment of the present invention is shown as constituting one cell or wing-box 10 of an aircraft wing 11. The cell 10 includes a pair of shear beams 12 each of which has an upper cap 13, an upper web 14, a lower cap 15 and a lower web 16. A plurality of vertical braces 18 and a plurality of diagonal braces 20 are rigidly affixed to the webs 14 and 16 to form a truss-type structure with caps 13 and 15. The beams 12 may be connected to adjacent wing boxes or to the fuselage 22 of an aircraft 24. Each upper cap 13 includes an inwardly facing flange 24 to which an upper structural panel 26 may be connected by a plurality of fasteners 28. Each upper cap 13 also includes an outwardly facing flange 30 to which adjacent upper panels 26a may be attached. Rigidity is imparted to the upper panel 26 by longitudinally extending ribs 32.

A lower panel 34 includes reinforcing ribs 36 and is secured to the inwardly facing flanges 40 on lower caps 15 by a plurality of fasteners 38. Outwardly facing flanges 42 are provided on the lower caps 15 so that adjacent panels 34a may be connected thereto.

When the lower panel 34 is removed, a fuel tank 44 may be inserted into the cell 10. The tank 44 is thermally isolated by being spaced from the panels 26 and 34 and from the beams 12. The tank 44 is structurally self-sufficient and contributes directly to the strength of wing box 10 by including a beam or tank spar 46 having an upper cap 47, upper web 48, lower cap 49 and a lower web 50. The caps 47 and 49 are secured to the panels 26 and 34, respectively, by fasteners 51. The webs 48 and 50 each include oppositely extending flanges 52 formed with a slight radius to conform to the curvature of a pair of side wall halves 54 forming the tank 44. The side walls 54 are welded to the flanges 52 along the entire length of the beam 46 to form a fluid-tight connection. The ends of tank 44 are closed with ellipsoidal heads 56 which bulge into the interior of the tank so that they will be loaded in hoop compression by the internal pressure of fuel in the tank 44.

A drain 58 is mounted across the lower portion of tank 44 (FIGURES 6 and 8) and penetrates both halves of the side walls 54 at their lowest points. Similarly, a tank ventilating pipe 60 (FIGURE 9) is connected to the tank 44 and penetrates the side wall halves 54 at their highest points.

The tank beam or spar 46 is given structural stability and load-carrying capacity by vertical and diagonal braces 62 and 64, respectively, which may be welded to the upper and lower webs 48 and 50 (FIGURE 6).

Buckling of the upper surface of tank 44 due to compression stresses induced by wing deflection is prevented by embossed reliefs or channels 66 which are incorporated in the upper portion of tank 44. This permits the tank to deflect by elastic deformation. However, this also precludes longitudinal stresses in the upper surface of the tank 44 resulting from internal pressure in the tank 44. Therefore, the longitudinal forces from the tank pressure are transferred by the tank heads 56 through the beam 46 to the wing box 10.

A plurality of bulkheads 70 (FIGURES 4 and 6) are incorporated into the tank 44 to support it within wing box 10. The bulkheads 70 include apertures 72 which are located superjacent the lowest portion of tank 44 to prevent the trapping of fuel between the bulkheads. The bulkheads 70 are rigidly affixed to vertical braces 62 and the flanges 52 along the tank spar 46 on suitable centers.

A series of modified I beam stiffeners 68 extending inward from the structural panels 26 and 34 are partially disposed within the channels 66.

The tank 44 may be given additional support by straps 74 (FIGURES 3 and 7) which are pinned to brackets 76 on upper web 14. A turnbuckle 78 passes through the lower web 50 in line with each set of straps 74. Each turnbuckle 78 includes pins 80 which engage straps 74 so that they may be tightened against side wall 54 of tank 44. A plurality of stiffeners 82 are mounted in tank 44 in line with straps 74 to reinforce the side wall 54 against buckling. The stiffeners 82 include apertures 84 which are located superjacent the lowest portion of tank 44 to prevent fuel from being trapped between the stiffeners. The straps 74 are spaced along beams 12 on suitable centers, as dictated by the weight of the fuel to be carried in tank 44.

Of course, it is apparent that the bulkheads 70 may be employed without straps 74 or, conversely, that the straps 74 may be used without the bulkheads 70. In either case, the center of tank 44 is integrally supported by cell 10 because the tank spar 46 is connected to panels 26 and 34.

A wing box 10a of lesser total height than 10 may use the arrangement shown in FIGURES 11 and 12 wherein a second embodiment of the present invention includes a fuel tank 44a having a central portion 90. The central portion 90 includes a tank beam 46a which may be identical with the beam shown in the previous embodiment, except that it is designed for a thinner cell 10a. Additional tank portions 92 having arcuate side wall portions 94, connected from top to bottom by tension webs 96, are attached to the central tank portion 90 through arcuate flanges 98. The side wall portions are affixed by a continuous weldment (not shown) to the arcuate flanges 98 of the tension webs 96. The webs 96 may also include a plurality of vertical and diagonal stiffeners 100. The tank 44a is supported within the wing cell 10a which includes upper and lower panels 26b and 34b, respectively, and a pair of shear beams 12a.

While the particular fuel tanks herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. In combination with an aircraft wing cell having shear beams and upper and lower structural panels affixed to said shear beams, a fuel tank comprising:
  (a) a fuel-tank shear beam for mounting said tank in said cell intermediate said wing-cell shear beams, said fuel-tank shear beam including an upper cap portion affixed directly to said upper panel and a lower cap portion affixed directly to said lower panel, said fuel-tank shear beam also including upper and lower web portions connected to said upper and lower cap portions, respectively;
  (b) side wall means connected to said upper and lower web portions in fluid-tight relationship; and
  (c) closed end wall means curved inward and mounted in said side wall means.

2. The fuel tank of claim 1 including a plurality of arcuate side wall sections and tension webs connecting said side wall sections to said side wall means.

3. The fuel tank of claim 1 wherein said upper and lower web portions include flanges having arcuate portions and said side wall means has a radius of curvature conforming to said arcuate portions of said flanges.

4. A load-carrying fuel tank comprising:
  (a) a shear beam, said shear beam including upper and lower cap portions and upper and lower web portions connected to said upper and lower cap portions, respectively, said shear beam also including braces connecting to said upper and lower web portions, each of said web portions including a pair of outwardly extending arcuate flanges inclined toward said included cap portion;
  (b) first arcuate side wall means connected to an upper flange and a lower flange on one side of said webs intermediate said upper and lower cap portions;
  (c) second arcuate side wall means connected to an upper flange and a lower flange on the other side of said webs intermediate said upper and lower cap portions, said first and second side wall means being in fluid communication with each other between said braces; and
  (d) closed end wall means mounted in the ends of said first and second side wall means.

5. Aircraft wing cell having shear beams and upper and lower structural panels affixed to the shear beams, the combination comprising:
  a fuel tank being mounted in the cell intermediate the shear beams,
  a fuel tank shear beam connecting the tank to the panels and extending through the tank, and the fuel tank including a central portion connected to the fuel tank shear beam and an outer portion having a plurality of arcuate side walls connected to either side of the central portion by tension webs mounted inside the fuel tank.

References Cited by the Examiner

UNITED STATES PATENTS

| | | | |
|---|---|---|---|
| 2,191,239 | 2/40 | Rethel et al. | 244—135 |
| 2,592,974 | 4/52 | Sulfrian | 220—15 |
| 2,602,614 | 7/52 | Cole | 244—135 |
| 2,637,513 | 5/53 | Wallen | 244—135 |
| 2,678,750 | 5/54 | King | 244—135 |
| 2,859,812 | 11/58 | Swanson | 244—135 |
| 2,920,784 | 1/60 | Boardman | 220—1 |

FOREIGN PATENTS 1,154,890  11/57  France.

FERGUS S. MIDDLETON, *Primary Examiner.*